G. B. ALLION.
ANTIVERMIN POULTRY PERCH HAVING ADJUSTABLE PLUGS.
APPLICATION FILED SEPT. 28, 1917.

1,263,015.

Patented Apr. 16, 1918.
2 SHEETS—SHEET 1.

Inventor
G.B.Allion
by Lester L. Sargent
Attorney

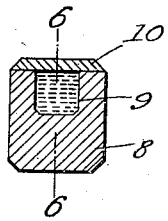
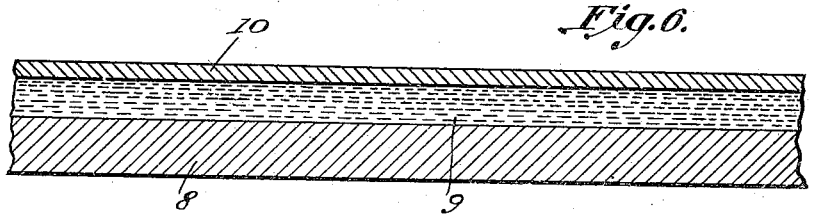
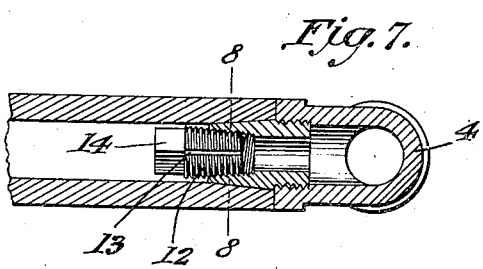
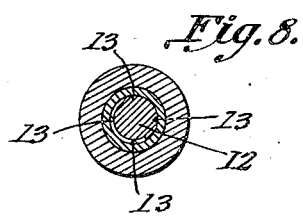
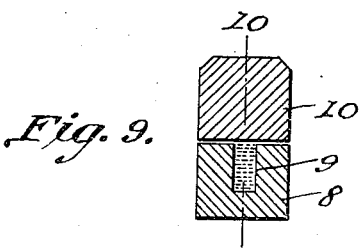
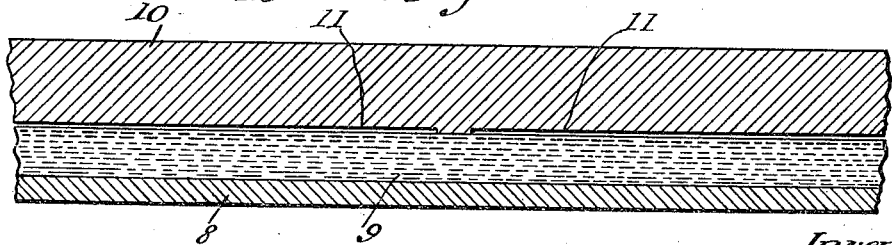

# UNITED STATES PATENT OFFICE.

GEORGE B. ALLION, OF WILLIS, MICHIGAN.

ANTIVERMIN POULTRY-PERCH HAVING ADJUSTABLE PLUGS.

1,263,015. Specification of Letters Patent. Patented Apr. 16, 1918.

Application filed September 28, 1917. Serial No. 193,756.

*To all whom it may concern:*

Be it known that I, GEORGE B. ALLION, a citizen of the United States, and resident of Willis, in the county of Washtenaw and State of Michigan, have invented new and useful Antivermin Poultry-Perches having Adjustable Plugs, of which the following is a specification.

The object of my invention is to provide a novel anti-vermin poultry perch; to provide novel means for supplying insecticide to the perch; to provide novel adjustable plugs to regulate the flow of insecticide to individual perches; and to provide means for applying the invention to an ordinary poultry perch. It is also my object to provide a novel combination and arrangement of parts disclosed in the accompanying drawings.

I attain the object of my invention by the mechanism illustrated in the accompanying drawings, in which:

Fig. 5 is a transverse section of one of the perches as reconstructed from an ordinary perch.

Fig. 6 is a longitudinal section on line 6—6 of Fig. 5;

Fig. 7 is a section through the end of one of the poultry perches, showing a longitudinally grooved adjustable plug 12;

Fig. 8 is a transverse section through the perch and plug on line 8—8 of Fig. 7.

Fig. 9 is a cross section of a modified form of perch;

Fig. 10 is a horizontal section on line 10—10 of Fig. 9.

Like numerals designate like parts in all the views.

Figure 1:
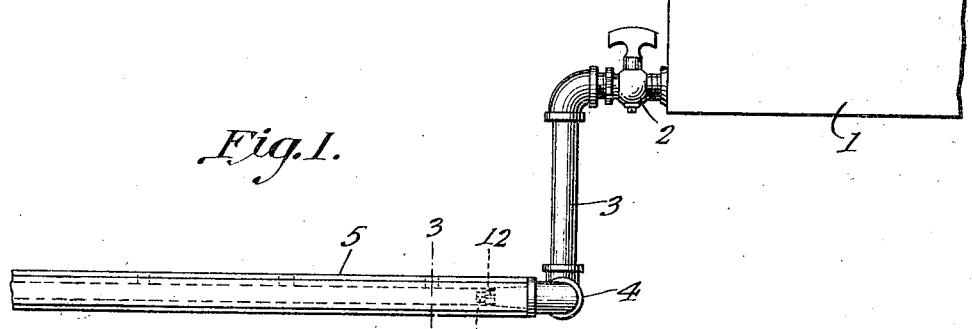
Figure 1 is a front elevation of the invention.
Figure 2:
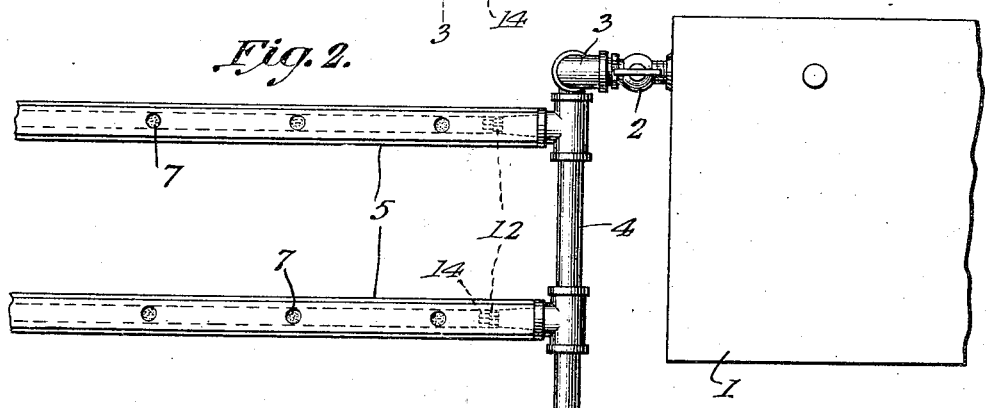
Fig. 2 is a top plan.
Figure 3:
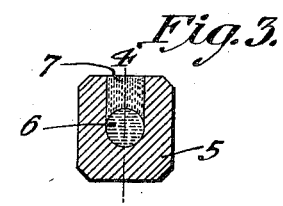
Fig. 3 is a transverse section of one of the perches on line 3—3 of Fig. 1.
Figure 4:
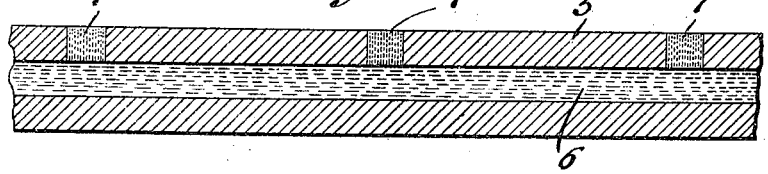
Fig. 4 is a longitudinal section on line 4—4 of Fig. 3.

Referring to the accompanying drawings I provide a suitable supply tank 1 having a suitable valve-controlled outlet 2, preferably opening into a suitable extension pipe 3, from which a plurality of suitable pipes or tubes 4 extend. Members 4 open into the ends of suitably excavated or hollow poultry perches 5. Insecticide fluid is supplied through the channeled portion 6 of the perches from whence it seeps through. I may provide suitable porous blocks 7 to facilitate the proper distribution of the insecticide to the perches, or the perch may be suitably excavated as in Fig. 5. In a modified form of my invention, such as shown in Fig. 10 I may provide suitable longitudinally extending slots 11 between portions 8 and 10 of the modified form of perch shown in Fig. 9. By this construction I am enabled readily to convert an ordinary poultry perch into an anti-vermin poultry perch by suitably excavating grooves, or boring out a channel in the member 8, and fastening a laterally slotted member 10 over the member 8, as illustrated in Fig. 6. The insecticide fluid will seep through the perch and effectually prevent it from becoming infested with vermin, or affording a means for their passage from the poultry house to the fowls when at roost.

Any suitable anti-vermin fluid may be placed in the receptacle 1, and its flow may be controlled by the valve outlet 2. The flow of the insecticide to the individual perches may be conveniently regulated to supply the proper amount to each perch by the adjustment of the adjustable dripping plugs 12. These plugs 12 are suitably positioned in the ends of the tubes or pipes 4, as shown in Fig. 7.

They are provided with a plurality of longitudinal grooves 13, which permit the insecticide to flow out, the quantity being regulated by the position of the plug. The plugs are slightly tapered and preferably (but not necessarily) threaded, and preferably are provided with knobs 14. These adjustable dripping plugs provide a material and essential improvement in anti-vermin perches, since they make possible the convenient regulation of the flow of insecticide to each perch, no matter how many perches there may be or how far their distance from the supply tank.

When adjusting these dripping plugs, the supply tank is first filled and the plug is then turned until it drips the required amount which is about four or five drops per minute for a twelve foot perch, and other lengths accordingly. If the poultryman wishes the insecticide to drip slower or more rapidly at any time, he simply withdraws the pipe from the perches and readjusts such of the dripping plugs as require adjustment.

The insecticide seeps through the porous or slotted perches and effectively protects the fowls from the attacks of vermin. The device is sanitary, and, after being adjusted properly, regulates the flow of insecticide without any further trouble or attention. The supply tank is sufficiently elevated so that the fluid will flow to the perches by gravity, and any number of perches may be supplied from a single tank. The pipes or tubes 4 may be merely connected with the ends of the perches, or extended into them to whatever extent is found desirable.

What I claim is:

1. In an anti-vermin poultry perch having an adjustable plug, the combination of an elevated supply tank, an outlet from the tank, one or more hollow poultry perches, conduits connecting the aforesaid outlet with the poultry perches, and an adjustable dripping plug adjustably mounted in the end of each conduit, said plug being tapered and having longitudinal grooving thereon to conduct a slow and regulatable flow of insecticide to the interior of the perch.

2. As a new article of manufacture for use in anti-vermin channeled poultry perches, in combination with one or more poultry perches and pipes opening into channeled portions of the perches, an adjustable dripping plug of slightly tapered form adapted to be adjustably disposed in the end of the channeled poultry perch, having grooves on its outer surface extending longitudinally to the plug to form a conduit for the passage of insecticide, substantially as shown.

GEORGE B. ALLION.

Copies of this patent may be obtained for five cents each, by addressing the "Commissioner of Patents, Washington, D. C."